(12) United States Patent
Beard

(10) Patent No.: US 7,579,117 B1
(45) Date of Patent: Aug. 25, 2009

(54) ELECTROCHEMICAL CELL ENERGY DEVICE BASED ON NOVEL ELECTROLYTE

(76) Inventor: Kirby Beard, 7024 Windswept La., Norristown, PA (US) 19403

( * ) Notice: Subject to any disclaimer, the term of this patent is extended or adjusted under 35 U.S.C. 154(b) by 371 days.

(21) Appl. No.: 11/508,039

(22) Filed: Aug. 22, 2006

Related U.S. Application Data

(60) Provisional application No. 60/711,062, filed on Aug. 25, 2005.

(51) Int. Cl.
*H01M 6/16* (2006.01)
(52) U.S. Cl. ...................................... 429/324; 429/305
(58) Field of Classification Search .................. 429/15, 429/29, 33, 305, 324
See application file for complete search history.

(56) References Cited

U.S. PATENT DOCUMENTS

| | | | |
|---|---|---|---|
| 4,225,402 A * | 9/1980 | LeRoy et al. ................. | 205/637 |
| 4,581,105 A * | 4/1986 | Chao et al. ................... | 205/412 |
| 5,480,742 A * | 1/1996 | Erez et al. ...................... | 429/66 |
| 2003/0019756 A1* | 1/2003 | Yoshida et al. ................ | 205/88 |
| 2005/0029117 A1 | 2/2005 | Mabrouk ...................... | 205/413 |

* cited by examiner

*Primary Examiner*—Patrick Ryan
*Assistant Examiner*—Ben Lewis
(74) *Attorney, Agent, or Firm*—Law Offices of J. D. Geraigery, P.C.; Janine D. Geraigery, Esq.

(57) ABSTRACT

A novel electrolyte system technology, based on a supercritical fluid solvent using any of a variety of conventional dissolved species with organic salts, hydrates and aqueous-based systems being preferred, that is useful in a variety of electrochemical applications, including batteries, capacitors, fuel cells, sensors, fusion reactors and other similar types of electrolytic cells.

14 Claims, 3 Drawing Sheets

Discharge Voltage Profile of Charged V2O5/LiCoO2 Cell
(1M LiBETI, 1,3 dioxolane with novel electrolyte solvent)

Discharge Voltage Profile
(MCMB anode, LiBETI salt in novel electrolyte solvent only, LiCoO2

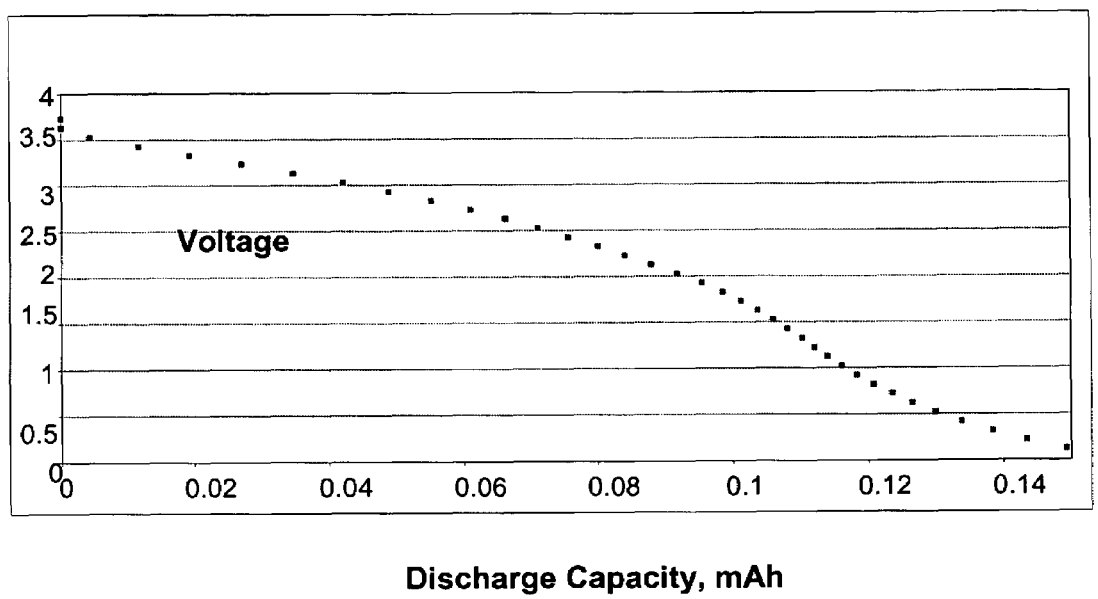

Discharge Capacity, mAh

Note: Cell was charged to ~50% of nominal capacity, but delivered < 10% capacity. Low electrolyte conductivity is the likely cause of the poor performance. However, the ability of the cell to accept charge and show modest capacity further supports the ability of the novel electrolyte solvent to function by itself.

FIG. 2

ELECTROCHEMICAL CELL ENERGY DEVICE BASED ON NOVEL ELECTROLYTE

CROSS REFERENCE TO RELATED APPLICATIONS

This application claims priority benefit of Provisional Application No. 60/711,062, filed in the United States Patent and Trademark Office on Aug. 25, 2005.

BACKGROUND OF THE INVENTION

1. Field of the Invention

The present invention relates to an electrolyte system technology, and more particularly to a novel electrolyte system based on a supercritical fluid solvent using a variety of dissolved species.

Supercritical fluids possess properties that are a combination of gas and liquid and are defined by the critical point for temperature and pressure. Specifically, the critical temperature is that value at which additional pressure will not condense the fluid to a liquid and the critical pressure is the value above which additional heat will not vaporize the fluid to a gas. Supercritical fluids possess unique solvent properties useful in various chemical formulations or processes. Many common compounds (water, nitrogen, hydrocarbons, fluorocarbons, etc.) possess supercritical properties, but often at quite elevated pressures or temperatures.

One of the well-known and more useful supercritical solvents is carbon dioxide (31 degrees Celsius critical temperature and 73 atmosphere critical pressure). Numerous chemical extraction processes, polymer synthesis, tertiary oil recovery operations, microbiological/pharmaceutical applications, etc. employ supercritical carbon dioxide as a primary solvent or a key co-solvent. In the supercritical state carbon dioxide has a density starting at less than 0.5 gm/cc and is miscible with water and many other organic liquids. Certain hydrocarbon polymers, large fluorocarbons molecules and other organic compounds are often especially soluble and miscible in supercritical carbon dioxide, but inorganic salts are generally rather insoluble and will even precipitate out of aqueous solutions in the presence of supercritical carbon dioxide (SC $CO_2$).

Unlike other common solvents used for electrolytes, SC $CO_2$ is virtually inert, totally non-toxic and non-flammable. Unlike aqueous and organic liquid electrolyte solvents, carbon dioxide will not decompose, react with other typical electrochemical cell components, form gaseous reaction products or solid deposits or create other safety or performance problems. Electrochemical applications involving organic solvents, on the other hand, suffer severe service life reductions, electrical output performance limitations and various safety issues due in large part to the use of chemically and thermally unstable electrolyte solvents. A variety of modifications to the base technology are also possible. A supercritical fluid can be used alone or in combination with other supercritical fluids or aqueous or organic liquids to provide a range of properties and performance capabilities.

The use of supercritical fluids or near supercritical liquids (liquefied/densified gases) have now been identified as a new, unexplored opportunity to provide an improved electrochemical system. Such solvent systems provide voltage, thermal and chemical abuse tolerance beyond all conventional organic and aqueous solvents and many inorganic materials. The viscosity, density and solvating properties of the supercritical fluid solvent are also superior to many other known systems.

Current state-of-the-art ambient temperature lithium batteries have good overall performance, but are typically based on thermally unstable organic liquid solvent electrolyte solutions. Power fade and safety issues of baseline cells have been two of the biggest and most perplexing problems to this point for lithium batteries used at high voltages, charge/discharge rates and temperatures. Furthermore, as the sizes and battery voltages become larger and the demands for extended life increase, the issues of safety and impedance increases become more acute. The basic concept is to design high pressure cylindrical cells with the smallest cell diameter possible. For example, when the cell diameter is double, the wall thickness must increase proportionately to maintain the same safety margins. Therefore, small diameter stainless steel cylinders with less than an inch diameter can meet the pressure requirements of 100 atmospheres in a wall thickness of less than one millimeter.

The increased weight of these cell cans would only result in a small penalty to overall battery weight. If necessary, the stainless steel cell can may be replaced with a thin wall aluminum can to achieve a weight reduction. These type of trade-offs are shown in Table 1, where "SS" is stainless steel and "FRP" is fiber reinforced epoxy.

TABLE 1

Cell Case Design Comparisons

| Cell Can Material (SS = 33 k psi yield, FRP = 16 k psi yield) | Can Diameter, inch | Can Wall Thickness, inch | Pressure at Yield, psig | Safety Factor at 100 atm | Comment |
| --- | --- | --- | --- | --- | --- |
| Stainless Steel Cynlindrical Cans | 0.7 | 0.015 | 1450 | 0.99 | typ. 18650 cell (~4 gm/cm len) |
| | 1 | 0.025 | 1684 | 1.15 | 10 gm/cm len |
| | 1 | 0.050 | 3438 | 2.34 | 20 gm/cm len |
| | 2 | 0.050 | 1684 | 1.15 | 40 gm/cm len |
| | 2 | 0.100 | 3438 | 2.34 | 80 gm/cm len |
| | 4 | 0.100 | 1684 | 1.15 | 160 gm/cm len |
| | 4 | 0.200 | 3438 | 2.34 | 320 gm/cm len |

TABLE 1-continued

Cell Case Design Comparisons

| Cell Can Material (SS = 33 k psi yield, FRP = 16 k psi yield) | Can Diameter, inch | Can Wall Thickness, inch | Pressure at Yield, psig | Safety Factor at 100 atm | Comment |
|---|---|---|---|---|---|
| Carbon Fiber/Epoxy Reinforced Cans | 1 | 0.050 | 1667 | 1.13 | 5 gm/cm len |
| | 2 | 0.100 | 1667 | 1.13 | 20 gm/cm len |
| | 4 | 0.200 | 1667 | 1.13 | 80 gm/cm len |

Prior technology utilizing supercritical fluid electrolytes has been limited to cover simple oxidation/reduction reactions at an electrode surface and do not suggest or allow for the transport of ions between electrodes. Furthermore, there has been no application for the use of supercritical fluid in an energy storage and energy production device where faradic, capacitive reactions must occur.

2. Description of the Related Art

United States Pat. App. No. 2005029117 to Patricia A. Mabrouk, deals with the electrochemical synthesis of electrically conductive polymers in supercritical fluids, for example supercritical $CO_2$. The use of the supercritical fluid as a solvent results in the reduction or elimination of hazardous reagents and environmentally hazardous waste, which was generated in the prior chemical synthesis techniques. The electrochemical approach eliminates the need to add a charge transfer agent as the electrode serves this purpose. The resulting polymers are characterized by high conductivities and distinctive surface morphology, which suggests that they may be more appropriate than the previous materials for certain applications (e.g., corrosion inhibition, optical applications, etc.).

United States Pat. App. No. 20030019756 to Hideo Yoshida; et al., deals with a novel method of electrochemical treatment such as electroplating, etc. and an electrochemical reaction apparatus thereof which is high in reactability and able to be electrochemically reacted efficiently, which is small or zero in amount of generation of liquid waste such as electrolytic solution and cleaning liquid and therefore amicable to the environment, and in which it is no more required to clean the electrode, etc. with cleaning liquid after reaction. Electrochemical reaction is executed in a reaction vessel (6) containing matter (5) which is in a supercritical or subcritical state and an electrolytic solution (1), and after reaction, the supercritical or subcritical matter (5) is shifted into a state of the matter (5) before being shifted into a critical state.

While these units may be suitable for the particular purpose employed, or for general use, they would not be as suitable for the purposes of the present invention as disclosed hereafter.

SUMMARY OF THE INVENTION

It is an object of the invention to provide a novel electrolyte system technology for potential use in electrochemical applications with batteries, capacitors, fuel cells, sensors and other similar types of electrolytic cells. Accordingly, the invention is a novel electrolyte system technology based on a supercritical fluid solvent using any of a variety of conventional dissolved species with organic salts, hydrates and aqueous-based systems.

It is another object of the invention to provide a novel electrolyte system that utilizes supercritical fluids to provide an improved electrochemical system. Accordingly, the invention is a novel electrolyte system that utilizes supercritical fluid solvents to provide voltage, thermal and chemical abuse tolerance beyond conventional organic and aqueous solvents.

It is another object of the invention to provide a novel electrolyte system that utilizes a supercritical carbon dioxide solvent that is virtually inert, non-toxic and non-flammable. Accordingly, the invention is a novel electrolyte system that utilizes supercritical carbon dioxide solvent that will not decompose, react with other typical electrochemical cell components, form gaseous reaction products or solid deposits or create other safety problems.

It is another object of the invention to provide for the use of supercritical fluids as a solvent for electrolyte salts. Accordingly, the invention is a novel electrolyte system that utilizes supercritical fluids as a solvent to produce ionically conductive solutions, which readily undergo rapid and efficient ionic transport between electrodes.

This invention is a novel electrolyte system technology, based on a supercritical fluid solvent using any of a variety of conventional dissolved species with organic salts, hydrates and aqueous-based systems being preferred, that is useful in a variety of electrochemical applications, including batteries, capacitors, fuel cells, sensors, electrochemical fusion reactors and other similar types of electrolytic cells.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is a discharge voltage profile for an electrochemical cell employing supercritical carbon dioxide as the sole electrolyte solvent in a conventional lithium ion cell.

DETAILED DESCRIPTION OF THE PREFERRED EMBODIMENTS

Figure 1:
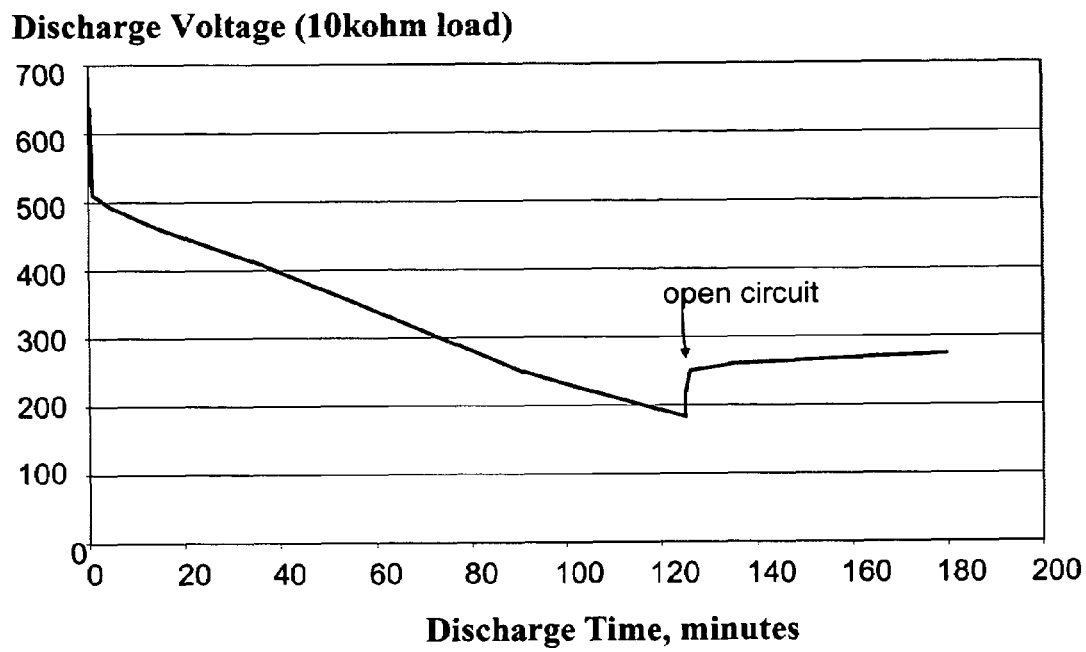
FIG. 1 is a discharge voltage profile for an electrochemical cell employing supercritical carbon dioxide as a co-solvent in a conventional lithium ion cell.
Figure 3:
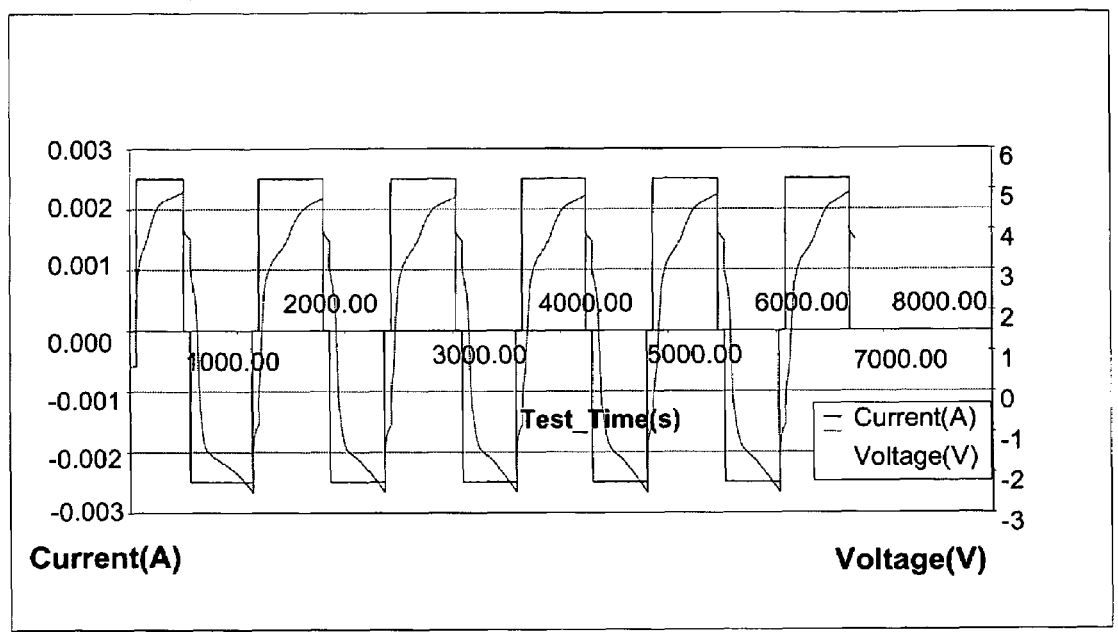
FIG. 3 is the cycling voltage profile for an electrochemical cell employing supercritical carbon as the sole electrolyte solvent in a conventional lithium ion cell when cycled at high rate between extreme voltage limits.

The present invention is directed to a process that involves the use of supercritical fluid or near supercritical liquid, including but not limited to liquid or SC $CO_2$, as a solvent for electrolyte salts to produce ionically conductive solutions, which readily undergo rapid and efficient ionic transport between electrodes. Referring to FIGS. 1-3, are examples of the compatibility of SC CO$_2$ with organic electrolyte salts, as shown in the electrochemical cell testing with the novel electrolyte system. These tests display the ability of the novel electrolyte system to show at least modest levels of electrochemical performance, exhibiting that the novel electrolyte solvent can function as an electrolyte system.

The simplest, most direct example of the invention is the use of carbon dioxide above 31 degrees Celsius and 73 atmospheres with a lithium organic salt as a conductive electrolyte solution. However, any dissociable ionic species that is soluble in any supercritical solvent and that can then function as an ionically conductive material may be used in any of a variety of compositions alone or with other liquids, salts, supercritical fluids or other additives. The partial pressure or molar composition of the supercritical fluid may range from 100% of the solvent to levels approaching 0% and still possibly prove effective as an electrolyte.

The primary requirement is that the dissociable (ionic) species is mixed and dissolved into the supercritical fluid and maintained at a pressure and temperature above the critical point. A selection of the optimal electrolyte salts or other ionic compounds is necessary for a successful use of the new supercritical fluid solvent system. Organic species that are useful as ion conductors in the present invention, include, but are not limited to organic lithium salts, ionic liquids, dianionic fluorosulfonimide salts, fluorosulfonate anions linked to oligomeric polyethylene glycol chains, polyelectrolyte zwitterions, and electrolyte salts based on the poly-fluorinated borane cluster anions.

Once the supercritical electrolyte solution is formed, the pressure and temperature conditions must be maintained to prevent the loss of the supercritical state of the primary solvent. One such way to prevent the loss is a hermetic container with externally applied heat, which will preserve the supercritical conditions. Also, to be useful as an electrochemical energy device, the supercritical fluid electrolyte must be combined with the electrodes used in the device. This may be accomplished by incorporating the electrodes in the container prior to the formation of the supercritical fluid environment. Alternatively, the supercritical fluid may be transferred from the original container to a second container or pressure vessel with the electrodes while maintaining supercritical conditions at all times.

In the most common usage the electrolyte system is expected to function well with conventional electrode systems. LiCoO$_2$ and derivative cathodes and carbon (MCBM) or graphite anodes are typical ones that will work well with the new solvent system. In addition, the new solvent system should be readily compatible with other conventional lithium battery solvents, including but not limited to ethylene carbonate, dimethyl carbonate, acetonitrile, THF and DME. SC CO$_2$ can readily be used as the electrolyte solvent on its own; however, situations may arise where the pure SC CO$_{21}$ solutions prove to have too little conductivity or external heating of the cells within the battery housing is not practical for maintaining adequate conductivity when ambient temperatures and corresponding cell pressures fall below the critical points. By adding minimal amounts of co-solvents to enable lower temperature performance, a broader range of uses can be achieved. Some examples include co-solvents such as thionyl chloride (SOCL$_2$), hydrocarbon solvents such as acetonitrile, diethyl carbonate and dimethyl formate.

Many of the numerous electrochemical systems identified over the years could potentially be adapted to use these supercritical or near-supercritical fluid electrolytes. In addition to the lithium ion batteries that include a mesophase carbon micro-bead anode with a LiCoO2 cathode separated by Celgard or similar microporous polymer separator, supercritical electrolyte solutions may be used in the construction of electrolytic capacitors with high surface area carbon/graphite/metallic particulate or filament composite electrodes. In addition to various lithium-ion cells, lithium metal primary and secondary cells, lead-acid, nickel-cadmium or nickel-metal hydride cells, silver-zinc couples, metal anode/air or oxygen cathode types, and fuel cells can all potentially be candidates for the present invention if dissociable ionic species with adequate solubility are used. Chemical sensors, gas detectors, chloro-alkali cells, electrophoresis and other chemical processing technologies requiring conductive solutions are other areas where the present invention may be applied.

The proposed technology may be extended to include supercritical fluids beyond SC CO$_2$, such as ethanol, Freon, nitrous oxide, and oxygen, used alone or in combinations with other fluids. However, the supercritical fluids must be compatible with the other components in the electrochemical system and that temperature and pressure conditions necessary to maintain the supercritical conditions can be created and preserved under the intended usage. The most important consideration in the selection of a supercritical fluid is that the electrochemical cell performance is improved.

A unique application involves the use of the novel solvent in a hybrid electrolytic fuel cell. Specifically, the extreme stability of SC CO$_2$, will enable the ability to input high levels of electrical and thermal energy into an electrolysis cell containing heavy water and other compounds with hydrogen isotopes of deuterium and tritium. The ability to apply high levels of current and/or voltage in a heated environment without solvent breakdowns provides the ability to achieve fusion reactions. Once the threshold of about 13 mega electron volts per nuclei is exceeded, the deuterium and/or tritium has the potential to fuse to form helium or atoms or isotopes with surplus heat generation useful in a properly controlled system as a source of energy in electrical or mechanical energy generation systems.

Unlike other fusion methods that require extreme high temperatures with plasma confinement systems, the present invention allows the fusion reactions to occur at temperatures and pressures as low as 31 degrees Celsius and 73 atmospheres. The energy required to initiate fusion may be readily imparted by the application of high voltage with only moderate current. Furthermore, with sufficient electrode plate area and proportionately increased inputs of electrical and thermal energy, larger quantities of heavy water or other hydrogen isotopes may be converted in a less well controlled reaction to instantaneously release massive quantities of energy in an explosive device useful for mining, demolition, or propulsion. The proposed explosive device would only detonate with the input of an extremely powerful and precise electrical pulse to instantly effect fusion reactions across the entire electrode surface.

A variety of process techniques are suitable for producing the supercritical fluid electrolyte solution. One possible process is where the solid or liquid ionic, dissociable species is placed in a container and carbon dioxide is added under pressure and with heating to create the supercritical fluid, followed by sufficient mixing energy and time to promote full dissolution and the formation of a conductive solution.

Another possible process includes the solid or liquid ionic, dissociable species being placed in a container and mixed with an optional co-solvent, such as the common organic liquids used to dissolve lithium salts. Once dissolved in the liquid, carbon dioxide is added under pressure and with heating to create the conductive solution with a mixture of both conventional liquid solvent and supercritical fluid solvent.

Another process involves the solid or liquid ionic, dissociable species being placed in a mix with an optional conductive polymer or other ionically conductive solid and formed into a solid or gelled film or other article. Once the solid conductor film is transferred to a container, carbon dioxide is added under pressure and with heating to create the conductive solution with a mixture of both conventional solid ion conductor and supercritical fluid solvent.

Finally, a solid or liquid ionic, dissociable species may be added to a container filled with supercritical fluid. If in the form of an ionic liquid, the dissociable species may be pumped under pressure into the chamber. If the dissociable species is a solid, it may be combined with the supercritical fluid by opening a port that allows the supercritical fluid to combine with the dissociable species.

In conclusion, herein is presented a novel electrolyte system. The invention is illustrated by example in the drawing figures, and throughout the written description. It should be understood that numerous variations are possible, while adhering to the inventive concept. Such variations are contemplated as being a part of the present invention.

What is claimed is:

1. A non-aqueous solvent electrolyte solution, within an electrochemical cell, comprising dissociable ionic species, selected from the group consisting of electrolytes with at least one ion consisting of proton cations, hydroxyl anions or either positively or negatively charged single atoms or low molecular weight functional groups, that are transported throughout a continuous phase of supercritical fluid electrolyte solvent between electrodes that provides high ionic conductivity throughout the electrode oxidation/reduction reactions wherein the electrochemical reactions produce a thermodynamically elevated energy state sufficient to yield an energy storage and production device.

2. The non-aqueous solvent electrolyte solution as in claim 1, further comprising one or more co-solvents that are miscible with the supercritical fluid, allow for dissociation and high conductivity of the dissociable ionic species, and are selected from the group consisting of organic liquids, inorganic liquids and organic acids and bases.

3. The non-aqueous solvent electrolyte solution as in claim 1, further comprising a conductive solid, including solid state conductors or ionic conductive polymers that may swell or gel with the supercritical fluid allowing for dissociation and high conductivity of the ionic species through said supercritical fluid.

4. The non-aqueous solvent electrolyte solution as in claim 1, further comprising one or more ionic species selected from the group consisting of organic salts, hydrated compounds, ionic liquids or ionic species based on protons or hydroxides as well as related hydrogen isotopes such as deuterium and tritium.

5. The non-aqueous solvent electrolyte solution as in claim 4, further comprising one or more ionic species selected from the group consisting of lithium, sodium or potassium organic salts, hydrates, ionic liquids or ionic species based on protons or hydroxides as well as related hydrogen isotopes such as deuterium and tritium.

6. A non-aqueous solvent electrochemical energy storage and production device as in claim 1 using a non-polar supercritical or near supercritical fluid, which has chemical, thermal and galvanic stability in excess of conventional aqueous and organic electrolyte solvents.

7. The non-aqueous solvent electrochemical energy storage and productive device as in claim 6, further comprising one or more solvents that are miscible with the supercritical fluid and allow for dissociation and high conductivity of the ionic species, and are selected from the group consisting of organic liquids, inorganic liquids and organic acids and bases.

8. The non-aqueous solvent electrochemical energy storage and production device as in claim 6, further comprising a conductive solid including solid state conductors or ionic conductive polymers that may swell or gel with the supercritical fluid, allowing for dissociation and high conductivity of the ionic species through said supercritical fluid.

9. The electrochemical energy storage and production device as in claim 6, further comprising an electrochemical cell or battery.

10. The electrochemical energy storage and production device as in claim 6, further comprising a capacitor.

11. The electrochemical energy storage and production device as in claim 6, further comprising a semi-fuel cell or fuel cell.

12. A method of generating thermal nuclear energy by the electrochemical conversion of hydrogen isotopes through high voltage, high energy electrolysis into helium and other products with a net output of energy, using the electrochemical energy storage and production device as in claim 6, further comprising an electrolysis cell made of heavy water, deuterium or tritium, useful as a fusion reactor.

13. The electrochemical energy storage and production device as in claim 6, further comprising one or more dissociable ionic species selected from the group consisting of organic salts, hydrated compounds, ionic liquids or ionic species based on protons or hydroxides as well as related hydrogen isotopes such as deuterium and tritium.

14. The electrochemical energy storage and production device as in claim 13, further comprising ionic species selected from the group consisting of lithium, sodium or potassium organic salts, hydrates, ionic liquids or aqueous ionic species based on protons or hydroxides as well as related hydrogen isotopes such as deuterium and tritium.

* * * * *